(12) United States Patent
Dui et al.

(10) Patent No.: US 8,311,399 B2
(45) Date of Patent: Nov. 13, 2012

(54) METHOD FOR FAST FORWARD/BACKWARD PLAY OF VIDEO DATA AND A STREAMING SERVER

(75) Inventors: Jiying Dui, Shenzhen (CN); Yaohui Li, Shenzhen (CN); Yandong Cao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1001 days.

(21) Appl. No.: 12/336,372

(22) Filed: Dec. 16, 2008

(65) Prior Publication Data

US 2009/0097819 A1    Apr. 16, 2009

Related U.S. Application Data

(63) Continuation of application No. PCT/CN2007/070685, filed on Sep. 13, 2007.

(30) Foreign Application Priority Data

Feb. 8, 2007    (CN) .......................... 2007 1 0007197

(51) Int. Cl.
*H04N 5/91*    (2006.01)
(52) U.S. Cl. ....................................................... 386/343
(58) Field of Classification Search .................. None
See application file for complete search history.

(56) References Cited

U.S. PATENT DOCUMENTS

| | | | |
|---|---|---|---|
| 5,864,682 A | 1/1999 | Porter et al. | |
| 6,023,553 A * | 2/2000 | Boyce et al. | 386/329 |
| 6,112,226 A | 8/2000 | Weaver et al. | |
| 6,760,536 B1 * | 7/2004 | Amir et al. | 386/344 |
| 6,871,006 B1 * | 3/2005 | Oguz et al. | 386/346 |
| 2003/0165322 A1 | 9/2003 | Demas et al. | |
| 2004/0093618 A1 | 5/2004 | Baldwin et al. | |
| 2005/0094809 A1 * | 5/2005 | Pedlow et al. | 380/200 |
| 2006/0093318 A1 | 5/2006 | Cohen et al. | |

FOREIGN PATENT DOCUMENTS

| | | |
|---|---|---|
| CN | 13966742 A | 2/2003 |
| CN | 1516184 A | 7/2004 |
| CN | 1556649 A | 12/2004 |

(Continued)

OTHER PUBLICATIONS

Partial English Translation of previously submitted Chinese Published Patent Application No. 1873820 A. Partial English Translation of previously submitted Chinese Published Patent Application No. 1705365 A.

(Continued)

*Primary Examiner* — Thai Tran
*Assistant Examiner* — Sunghyoun Park
(74) *Attorney, Agent, or Firm* — Brinks Hofer Gilson & Lione (57) ABSTRACT

An embodiment of the present invention disclose a method for fast forward/backward play of video data includes: obtaining fast forward/backward index information that meets a fast forward/backward play request from a pre-generated fast forward/backward sequence index file according to the fast forward/backward play request from a client; and obtaining video data that meets the fast forward/backward play request from a pre-generated fast forward/backward sequence file according to the index information and transmitting the video data to the client via a network. An embodiment of the present invention also discloses a streaming server. With the method and streaming server provided by the present invention, the fast forward/backward video data reading efficiency of the streaming server may be improved.

17 Claims, 4 Drawing Sheets

FOREIGN PATENT DOCUMENTS

| | | |
|---|---|---|
| CN | 1705365 | 12/2005 |
| CN | 1873820 | 12/2006 |
| CN | 1883206 | 12/2006 |
| CN | 100551043 C | 10/2009 |
| EP | 0812112 | 12/1997 |
| EP | 1 329 101 | 5/2002 |
| EP | 1699240 A1 | 9/2006 |
| JP | 2001-54066 A | 2/2001 |
| KR | 20050032899 | 4/2005 |
| WO | 0235832 A2 | 5/2002 |

OTHER PUBLICATIONS

Written Opinion of the International Searching Authority issued in corresponding PCT Application No. PCT/CN2007/070685; mailed Dec. 20, 2007.

Office Action issued in corresponding Chinese Patent Application No. 2007100071971; issued Apr. 24, 2009.

Office Action issued in corresponding European Patent Application No. 07 801 093.1; issued Feb. 22, 2010.

* cited by examiner

METHOD FOR FAST FORWARD/BACKWARD PLAY OF VIDEO DATA AND A STREAMING SERVER

CROSS-REFERENCE TO RELATED APPLICATIONS

This application is a continuation of International Application No. PCT/CN2007/070685 filed on Sep. 13, 2007, which claims priority to Chinese Patent Application No. 200710007197.1, filed with the Chinese Patent Office on Feb. 8, 2007, both of which are incorporated herein by reference in their entireties.

FIELD OF THE INVENTION

The present invention relates video data play technologies and in particular to a method for fast forward/backward play of video data and a streaming server.

BACKGROUND OF THE INVENTION

With improvement of the infrastructure of broadband networks, streaming services are more and more extensively applied. In a streaming application, when a streaming server receives a play request from a client, the streaming server reads media data from a media file, including video and audio data, and transfers the data to the client continuously in real time. In the Video on Demand (VoD) application, a client can also issue fast forward or fast backward commands to the streaming server so that the user can view contents before or after the current picture.

A media file is usually large in size and therefore needs to be compressed so as to reduce the cost of storage devices and the bandwidth required for transporting media streams. So far, there are three methods for compressing media data. These three methods are common known in the concerned field and therefore not described further here.

Different compression methods achieve different compression effects. Using the prior three methods to compress media data will generate three types of video data frames, specifically, I frame, P frame and B frame. The I frame does not require other reference frames. Compared with the P frame and the B frame, an I frame needs a larger amount of data; a P frame needs about half the amount of data needed by an I frame and a B frame needs about ¼ the amount of data needed by an I frame. In addition, because the P frame and the B frame require other reference frames, once some media data is lost during transportation, the error will exist at all time so that the image cannot be restored. Therefore, an I frame is sent at a regular interval during transport of a media stream for restoration upon error. Between every two I frames, there are usually 12 to 15 P frames or B frames.

Even though multiple compression technologies are adopted, a media file is still large and as a result, it is time consuming to read a media file and stream media data. To minimize the time to read and transport media stream data, when processing a fast forward play request or a fast backward play request, a streaming application does not simply send media stream data at a higher speed. Instead, it minimizes the amount of transferred media data on the condition of satisfying user experience.

In a first method for fast forward/backward play of a video file in the prior art, I frames of the original media file are extracted out and one or more zero frames (ZPs) are inserted between adjacent I frames according to the size of I frames at different time to create a new I frame file, together with an I frame index file. The ZP is a type of P frame, which has the same image contents as the previous I frame. The ZP is inserted to guarantee that the output bit rate at the time of fast forward/backward play of a video stream is the same as that at the time of normal play.

Upon receipt of a fast forward or fast backward play request, a streaming server first determines the first I frame to be transmitted according to the command type of the play request and the image currently being transmitted; then the streaming server locates the first I frame in the index file according to the sequence number of the first I frame to be transmitted and determines the number of ZP frames to be inserted according to the size of the first I frame; the streaming server sends the first I frame and the ZP frame(s) to be inserted to the network via a stream generator. Then the streaming server sends the following I frames and ZP frames in the same steps.

In a second method for fast forward/backward play of video data in the prior art, the streaming server first extracts all I frames from an obtained original media file to form an I frame sequence. To ensure that the output bit rate of video data in fast forward or fast backward play is the same as that in normal play, the streaming server determines the size of a standard I frame according to the number of frames played by the player in a second, the network transport bit rate (TBR) and the video bit rate (VBR), and modifies the input I frame to the size of the standard I frame. The modified I frame is called a T frame. One or more B or P frames are inserted between two adjacent T frames. These B or P frames have the same image contents as the adjacent I frame so that the played image is smoother. The streaming server uses the generated T frame sequence directly to form a media file for fast forward and modifies the time stamp in the T frame sequence to form a media file for fast backward. Meanwhile, the streaming server generates an index file. When normal play is switched to fast forward, the streaming server searches the index file for the next I frame to be transmitted in the original media file, finds the T frame in the fast forward media file corresponding to the I frame, and then reads and transmits the T frame and the video data after the T frame from the fast forward media file; when fast forward is switched to normal play, the streaming server searches the index file for the next T frame to be transmitted in the fast forward media file, finds the I frame in the original media file corresponding to the T frame, and then reads and transmits the I frame and the video data after the I frame from the original media file. Back forwarding is processed in a similar way with a difference in that the fast backward media file is used.

The inventor finds that the two methods enable the streaming server to output video data in fast forward or fast backward in the same bit rates as in normal play. Because all I frames are extracted and stored as a separate fast forward and fast backward media file, multiple I frames can be read at a time, which improves the efficiency in reading I frames to some extent. However, the two methods do not consider that it is not necessary to transmit all I frames when the scale for fast forward/backward increases. Usually, fast forward/backward scale can be 2 times (2×), 4×, 8×, 16× and 32× as high as the normal scale. When the scale is high, like 32×, the reading efficiency with adoption of the two methods in the prior art is only 6.25%. In addition, to read and transmit all I frames for high scale fast forward/backward may go beyond the read capacity of the hard disk, the transport bandwidth of the network, and the receipt capacity of the client. Therefore, in the case of high scale fast forward/backward, it is necessary to discard some I frames at certain time intervals so that most data read from the fast forward/backward media file need be discarded. The processing capability of the hard disk is therefore wasted and the number of concurrent fast forward/backward sessions the system can support also drops. As a result, the streaming server cost apportioned to each user is increased.

SUMMARY OF THE INVENTION

Embodiments of the present invention provide a method for fast forward/backward play of video data and a streaming server so as to improve the video data reading efficiency of the streaming server.

A method for fast forward/backward play of video data includes:

obtaining fast forward/backward index information that meets a fast forward/backward play request from a pre-generated fast forward/backward sequence index file according to the fast forward/backward play request from a client; and obtaining video data that meets the fast forward/backward play request from a pre-generated fast forward/backward sequence file according to the index information and transmitting the video data to the client via a network.

A streaming server includes: a stream generator, a storage unit, a fast forward/backward sequence resolver and a fast forward/backward sequence generator, in which, the storage unit is adapted to store an original media file, a fast forward/backward sequence file, and a fast forward/backward sequence index file from the fast forward/backward sequence generator;

the fast forward/backward sequence generator is adapted to obtain video data necessary for fast forward/backward play at different scales from the original media file, generate the fast forward/backward sequence file and the fast forward/backward sequence index file, and store the files in the storage unit;

the stream generator is adapted to receive a fast forward/backward play request from a client, command the fast forward/backward sequence generator to execute the fast forward/backward play request, and transmit video data that meets the play request to the client via a network; and the fast forward/backward sequence resolver is adapted to receive the command from the stream generator, obtain fast forward/backward sequence index information that meets the play request from the fast forward/backward sequence index file, obtain video data that meets the play request from the fast forward/backward sequence file according to the index information, and send the video data to the stream generator.

According to the above technical solution, the streaming server provided by embodiments of the invention obtains video data necessary for fast forward/backward play at different scales from the original media file and generates a fast forward/backward sequence file using the obtained video data, and there is also a pre-generated fast forward/backward sequence file in the method for fast forward/backward play of video data provided by embodiments of the invention. Because this fast forward/backward sequence file considers that different video data are required for fast forward/backward play at different scales, the video data reading efficiency of the streaming server is increased.

DETAILED DESCRIPTION OF THE INVENTION

To make the objective, technical solution and advantages of the present invention clearer, the following describes the embodiments of the present invention in detail in combination with the accompanying drawings.

A method for fast forward/backward play of video data according to an embodiment of the invention includes: obtaining video data necessary for fast forward/backward at different scales from the original media file and generating a fast forward/backward sequence file and a fast forward/backward sequence index file using the obtained video data;

Upon receipt of a fast forward/backward play request from a client, the streaming server obtains fast forward/backward sequence index information that meets the received play request from the fast forward/backward sequence index file, obtains video data that meets the received play request from the fast forward/backward sequence file, and transmits the video data to the client via the network.

When the play request received by the streaming server changes normal play to fast forward/backward at a specific scale, the step of obtaining video data that meets the play request includes:

determining the first I frame of the specific scale after or before the last video data I frame transmitted as the I frame to be transmitted;

when the last I frame currently transmitted is a normally played I frame, searching the fast forward/backward sequence index file to obtain index information of the I frame to be transmitted, locate and read the I frame to be transmitted from the fast forward/backward sequence file and transmit the I frame to the client;

if the last I frame transmitted is played in fast forward/backward at a specific scale, determining whether the I frame to be transmitted is already read to the buffer; if so, locating and reading the I frame to be transmitted from the buffer and transmit it to the client; otherwise, searching the fast forward/backward sequence index file to obtain and locate index information of the I frame to be transmitted, locating and reading the I frame to be transmitted from the fast forward/backward sequence file according to the obtained index information, and transmitting the I frame to the client.

When the streaming server receives a play request to change the initial scale to a target scale during a fast forward/backward play, the step of obtaining video data that meets the received play request includes:

determining the first I frame of the target scale after or before the last I frame transmitted as the I frame to be transmitted;

checking whether the current video data read to the buffer already includes the I frame to be transmitted; if so, locating and reading the I frame to be transmitted from the buffer and transmitting the I frame to the client; otherwise, searching the fast forward/backward sequence index file to obtain index information of the I frame to be transmitted, locating and reading the I frame to be transmitted from the fast forward/backward sequence file according to the obtained index information, and transmit the I frame to the client.

In this embodiment of the invention, a first implementation scheme for generating a fast forward/backward sequence file and a fast forward/backward sequence index file using the obtained video data includes the following steps.

Select at least two fast forward/backward scales, one as a standard scale and the other scales as compensation scales for high scales, and obtain video data respectively necessary for ast forward/backward play at the selected scales from the original media file;

Mix the obtained video data respectively necessary for fast forward/backward play at different scales in turn according to selected proportions to generate multiple hybrid fast forward/backward sequence units of a set size.

The size of each hybrid fast forward/backward sequence unit may be set according to the size of the buffer. Each hybrid fast forward/backward sequence unit includes: a standard scales fast forward/backward sequence, at least one high scale fast backward compensation sequence and at least one high scale fast forward compensation sequence.

The start position of every high scale fast forward compensation sequence is determined by the end position of the standard scale fast forward/backward sequence; the end position of every high scale fast backward compensation sequence is determined by the start position of the standard scale fast forward/backward sequence.

In this implementation scheme, the step of generating a fast forward/backward sequence file includes:

generating an index file for hybrid fast forward/backward sequence units, in which the index file includes attribute information of hybrid fast forward/backward sequence units, position information of hybrid fast forward/backward sequence units in the fast forward/backward sequence file, and position information of every corresponding high scale fast forward/backward sequence index;

generating a standard scale fast forward/backward sequence index file, which includes attribute information of every I frame in the standard scale fast forward/backward sequence and position information of every I frame in the fast forward/backward sequence index file;

generate the high scale fast forward/backward sequence index of every hybrid fast forward/backward sequence unit, in which every high scale fast forward/backward sequence index includes attribute information of all high scale I frames included in the corresponding hybrid fast forward/backward sequence unit and position information of the I frames in the fast forward/backward sequence index file.

At present, a streaming server usually supports 2×, 4×, and 8× fast forward and backward. Some streaming servers also support 16× and 32×. There are many options for step A where at least two scales are selected. For example, all scales that the system supports, such as 2×, 4×, 8×, 16×, and 32×, may be selected and then the 2× is selected as the standard scale and 4×, 8×, 16× and 32× as compensation scales for high scales; alternatively, the 2× may be selected as the standard scale and 8× and 32× as the compensation scales for high scales.

For description purposes, all embodiments hereafter assume 32× as the maximum fast forward/backward scale that is supported by the streaming server. 2×, 4× and 8× are selected as low scales and 16× and 32× as high scales, with 2× as the standard scale and 16× as the compensation scale for high scales. In this condition, the step of obtaining video data necessary for fast forward/backward play at different scales from the original media file includes:

obtaining from the original media file a video data sequence necessary for fast forward/backward play at the standard scale, that is, 2×, and a video data sequence necessary for fast forward/backward play at the compensation scale for high scales, that is, 16×.

Suppose that n I frames in a video clip are transmitted at 2× fast forward/backward play. Number these I frames in an ascending order according to the sequence of normal play so that these I frames are identified as $I_1, I_2, \ldots, I_n$, which are called I frames for scale 2. The lasting duration is m seconds. Then, when the same video clip is played at the 4×, the duration will be half, that is, m/2 seconds. To ensure an constant bit rate video stream, it is only necessary to transmit half of these I frames, specifically, $I_1, I_3, \ldots, I_n$, which are called I frames for scale 4. At 8× play, ¼ of the I frames for scale 2 are extracted and transmitted and the corresponding I frames are called I frames for scale 8. So on with 16× and 32×. Therefore, the video data sequence necessary for standard scale fast forward/backward is the I frames for scale 2 and the video data sequence necessary for the compensation scale for high scales is the I frames for scale 16. The description hereafter all adopts the foregoing mode of I frame numbering.

The step of generating a fast forward/backward sequence file using the obtained video data includes:

mixing the received I frames for scale 2 and I frames for scale 16 in turn according to selected proportions to generate multiple hybrid fast forward/backward sequence units of a set size, in which every hybrid fast forward/backward sequence unit includes: a standard scale fast forward/backward sequence, a high scale fast forward compensation sequence, and a high scale fast backward compensation sequence; the start position of the high scale fast forward compensation sequence is determined by the end position of the standard scale fast forward/backward sequence; the end position of the high scale fast backward compensation sequence is determined by the start position of the standard scale fast forward/backward sequence.

Here, the size of each hybrid fast forward/backward sequence unit in the fast forward/backward sequence file is set according to the buffer size.

The standard fast forward/backward sequence stores the I frames for scale 2. When the streaming server traverses the original media file, the streaming server extracts I frames for scale 2 and stores them in a time sequence into the standard fast forward/backward sequence of a hybrid fast forward/backward sequence unit. When the I frames for scale 2 stored in one hybrid fast forward/backward sequence unit exceed the preset proportion, storing I frames for scale 2 into the unit stops and subsequent I frames for scale 2 are stored into the next hybrid fast forward/backward sequence unit. When the extracted I frames for scale 2 are below the preset proportion, 0s are added to fill the gap. From the above storage mode, it can be seen that one 2× I frame only exists in one hybrid fast forward/backward sequence unit. Different hybrid fast forward/backward sequence units will not have a same 2× I frame.

The high scale compensation sequence stores I frames for scale 16. Suppose the I frame in the original media file corresponding to first I frame of the standard fast forward/backward sequence of the current unit is numbered $I_j$. The streaming server traverses the original media file in an reverse order from $I_j$ to find I frames used for 16× fast backward play before $I_j$ and places these I frames in turn into the hybrid fast forward/backward sequence unit. When the preset proportion of the high scale backward compensation sequence is met, storing I frames for scale 16 before $I_j$ stops and subsequent I frames for scale 16 before $I_j$ are stored into the next hybrid fast forward/backward sequence unit. When the extracted I frames for scale 16 are below the preset proportion of the high scale fast backward compensation sequence, 0s are added to fill the gap. An I frame in a high scale fast backward sequence may exist in multiple hybrid fast forward/backward sequence unit, because one high scale I frame may be a high scale fast backward compensation I frame in the hybrid fast forward/backward sequence unit and also a high scale fast forward compensation I frame in the previous hybrid fast forward/backward sequence unit.

The high scale fast forward compensation sequence stores I frames used for 16× fast forward. Suppose the I frame in the original media file corresponding to last I frame of the standard fast forward/backward sequence of the current hybrid fast forward/backward sequence unit is numbered $I_k$. The streaming server traverses the original media file from $I_k$ to find I frames used for 16× fast forward play after $I_k$ and places these I frames in turn into the hybrid fast forward/backward sequence unit. When the preset proportion of the high scale forwarding compensation sequence is met, storing I frames for scale 16 after $I_k$ stops and subsequent I frames for scale 16 after $I_k$ are stored into the next hybrid fast forward/backward sequence unit. When the extracted I frames for scale 16 are below the preset proportion of the high scale fast forward compensation sequence, 0s are added to fill the gap. An I frame in a high scale fast backward sequence may exist in multiple hybrid fast forward/backward sequence unit, because one high scale I frame may be a high scale fast forward compensation I frame in the hybrid fast forward/backward sequence unit and also a high scale fast backward compensation I frame in the next hybrid fast forward/backward sequence unit.

The proportions of different parts in a hybrid fast forward/backward sequence unit may be selected according to the respective frequency in using different fast forward/backward scales. In the case of 2× as the standard scale and 16× as the high scale compensation scale, a preferred proportion scheme is: the standard fast forward/backward sequence occupies half the space, the high scale fast forward compensation sequence and the high scale fast backward compensation sequence each take ¼ space.

Figure 1:
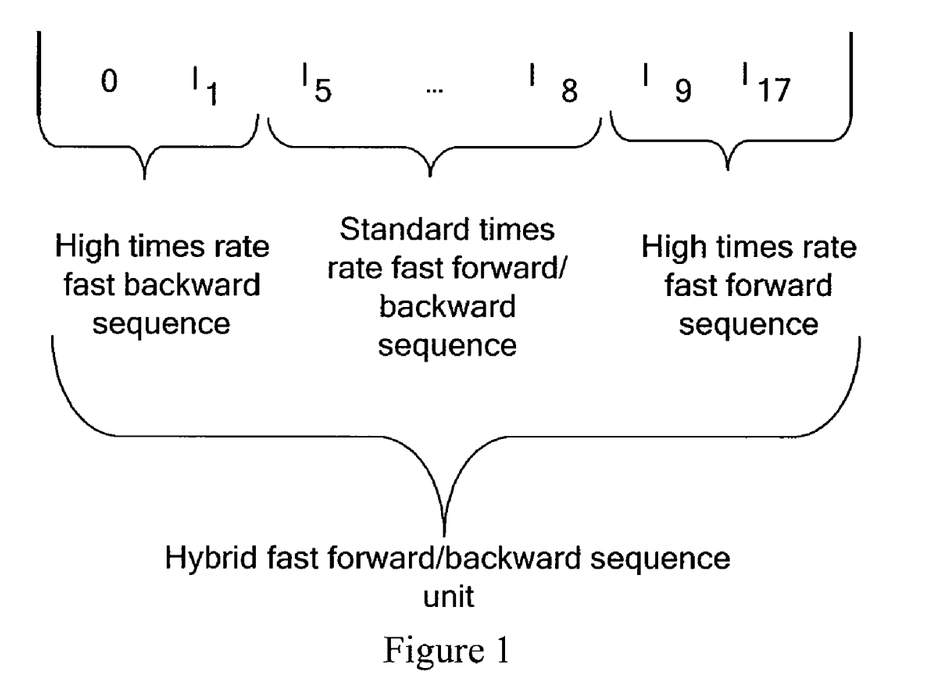
FIG. 1 shows the structure of a hybrid fast forward/backward sequence unit according an embodiment of the invention.

FIG. 1 shows the structure of a hybrid fast forward/backward sequence unit according an embodiment of the invention. Suppose the standard scale fast forward/backward sequence in the hybrid fast forward/backward sequence unit includes four I frames from $I_5$ to $I_8$. The streaming server traverses the original media file from $I_5$ backwards to find I frames before $I_5$ and selects the I frames for 16× playing, only $I_1$ in this case. Then the streaming server stores $I_1$ in the current high scale fast backward sequence and adds 0s to fill the remaining space. This sequence occupies altogether ¼ of the total space. The streaming server traverses the original media file from $I_8$ forwards to find I frames after $I_8$ and selects the I frames for 16× playing, $I_9$ and $I_{17}$ in this case. Suppose the two I frames occupies exactly ¼ of the space. $I_9$ and $I_{17}$ are filled in the high scale fast forward sequence.

In the above implementation scheme, the fast forward/backward index file generated in the mean time is used for locating the position of each video data I frame in the fast forward/backward sequence file. A preferred implementation includes the following steps:

generating an index file for hybrid fast forward/backward sequence units, the index file including identification information of hybrid fast forward/backward sequence units, position information of hybrid fast forward/backward sequence units in the fast forward/backward sequence file, and position information of corresponding high scale fast forward/backward sequence indexes; (Specifically, the following information of all hybrid fast forward/backward sequence units may be recorded in the index file: identification information set for a hybrid fast forward/backward sequence unit, such as a serial number, start position of the hybrid fast forward/backward sequence unit in the hybrid fast forward/backward sequence file, size of the hybrid fast forward/backward sequence unit, and position information of the high scale fast forward/backward sequence index file corresponding to the hybrid fast forward/backward sequence unit in the fast forward/backward index file.)

generating a standard scale fast forward/backward sequence index file, which includes identification information of every I frame in the standard scale fast forward/backward sequence, such as a serial number, and position information of every I frame in the fast forward/backward sequence index file. (Specifically, the following information may be recorded in the index file: all selected standard scales, such as 2×, serial number of every fast forward/backward I frame, serial number of the hybrid fast forward/backward sequence unit where the I frame is located, start position of the I frame in the hybrid fast forward/backward sequence unit and size of the I frame.)

generating the high scale fast forward/backward sequence index of every hybrid fast forward/backward sequence unit, every high scales fast forward/backward sequence index including identification information of all high scale I frames included in the corresponding hybrid fast forward/backward sequence unit and position information of the I frames in the fast forward/backward sequence index file, in which the identification information of a high scale I frame may be a serial number of the high scale I frame.

Because one high scale I frame may exist in multiple hybrid fast forward/backward sequence units, high scale fast forward/backward sequence indexes are grouped by hybrid fast forward/backward sequence units. Each hybrid fast forward/backward sequence unit has a separate high scale fast forward/backward sequence index. All high scale I frames, including high scale I frames in the standard sequence and those in the compensation sequence, are selected from each hybrid fast forward/backward sequence unit and the following information of the I frames is recorded: serial number of each I frame, serial number of the hybrid fast forward/backward sequence unit where the I frame is located, start position in the hybrid fast forward/backward sequence unit, and size of the I frame.

Figure 2:
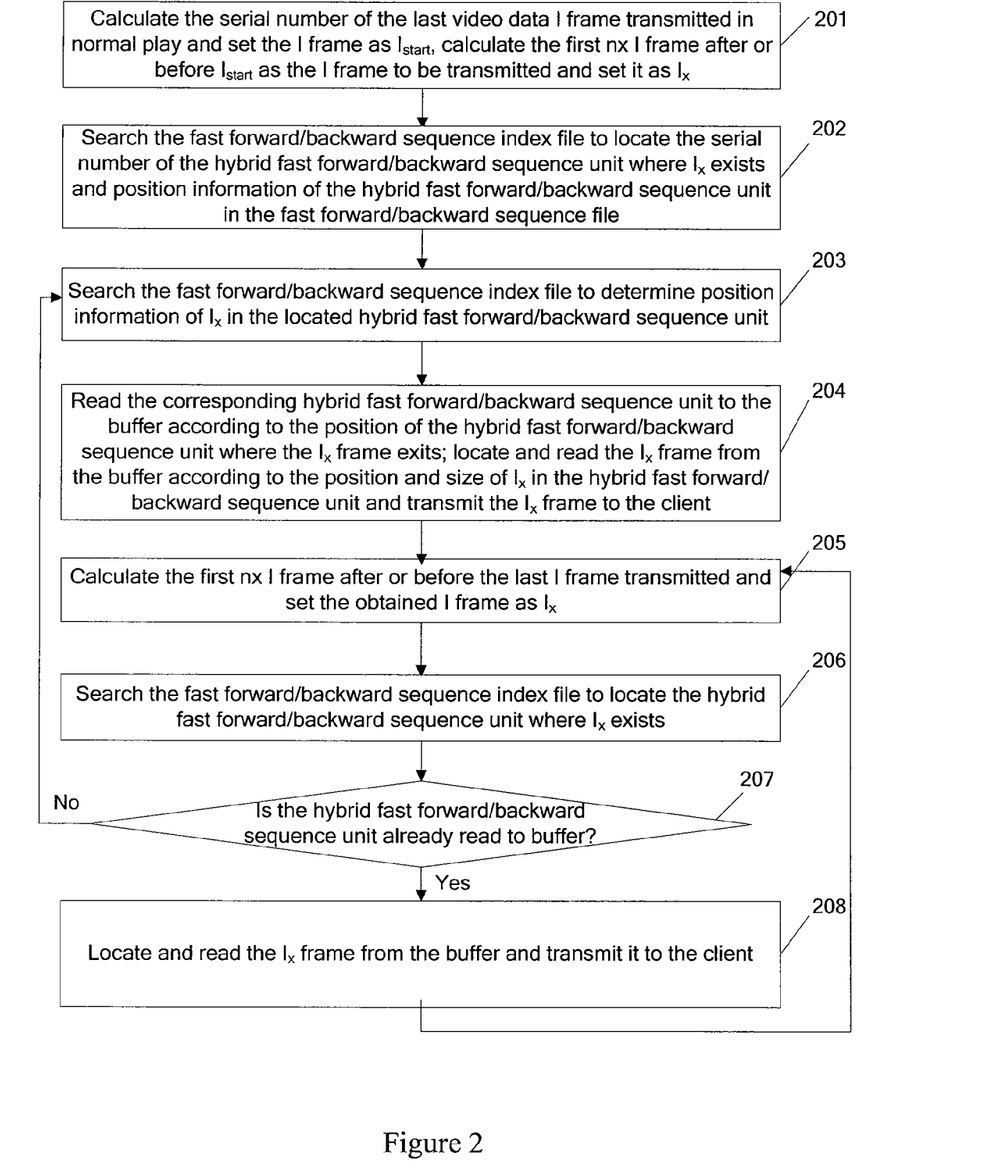
FIG. 2 is a flow chart for fast forward/backward play of video data according to an embodiment of the invention.

FIG. 2 is a flow chart for fast forward/backward play of video data according to an embodiment of the invention. The flow chart illustrates a procedure where a streaming server switches from normal play to fast forward or fast backward play. The procedure includes the following steps:

Step 201: Calculate the serial number of the last video data I frame transmitted in normal play and set the I frame as $I_{start}$, and calculate the first I frame for scale n after or before $I_{start}$ as the I frame to be transmitted, $I_x$.

Step 202: Search the fast forward/backward sequence index file to locate the serial number of the hybrid fast forward/backward sequence unit where $I_x$ exists and position information of the hybrid fast forward/backward sequence unit in the fast forward/backward sequence file.

Here, the position information of the hybrid fast forward/backward sequence unit in the fast forward/backward sequence file may be represented by the start position information of the hybrid fast forward/backward sequence unit in the fast forward/backward sequence file and the size of the hybrid fast forward/backward sequence unit.

Step 203: Search the fast forward/backward sequence index file to determine position information of $I_x$ in the located hybrid fast forward/backward sequence unit.

Here, the position information of $I_x$ in the located hybrid fast forward/backward sequence unit may be represented by the start position information of $I_x$ in the located hybrid fast forward/backward sequence unit and the size of $I_x$.

Step 202 and step 203 together locate the position information of the $I_x$ frame to be transmitted in the fast forward/backward sequence file.

Step 204: Read the corresponding hybrid fast forward/backward sequence unit to the buffer according to the position of the hybrid fast forward/backward sequence unit where the $I_x$ frame exits; locate and read the $I_x$ frame from the buffer according to the position and size of $I_x$ in the hybrid fast forward/backward sequence unit and transmit the $I_x$ frame to the client.

Step 205: Calculate the first I frame for scale n after or before the last I frame transmitted and set the obtained I frame as $I_x$.

Step 206: Search the fast forward/backward sequence file to locate the hybrid fast forward/backward sequence unit where the $I_x$ frame exists. If the unit is already read to the buffer, locate and read the $I_x$ frame from the buffer directly, transmit it to the client and the procedure goes back to step 205; otherwise, the procedure goes back to step 203.

When the procedure shown in FIG. 2 is applied in switching from normal play to fast forward or fast backward play at a preset low scale, step 206 of searching the fast forward/backward sequence index file is: searching for the standard scale fast forward/backward sequence index in the fast forward/backward sequence index file.

When the procedure shown in FIG. 2 is applied in switching from normal play to fast forward or fast backward play at a preset high scale, step 206 of searching the fast forward/backward sequence index file is: search for the high scale fast forward/backward sequence index in the fast forward/backward sequence index file.

In the procedure shown in FIG. 2, once the streaming server receives a command to stop or change the current play mode, the current procedure ends.

When the streaming server receives a command to stop or change the current play mode, if the command is to play the media stream file normally, the streaming server calculates the start position of the media stream file for normal play according to the serial number of the last I frame transmitted, obtains the corresponding media stream data from the original media file according to the located start position, and transmits the obtained media stream data to the client.

Figure 3:
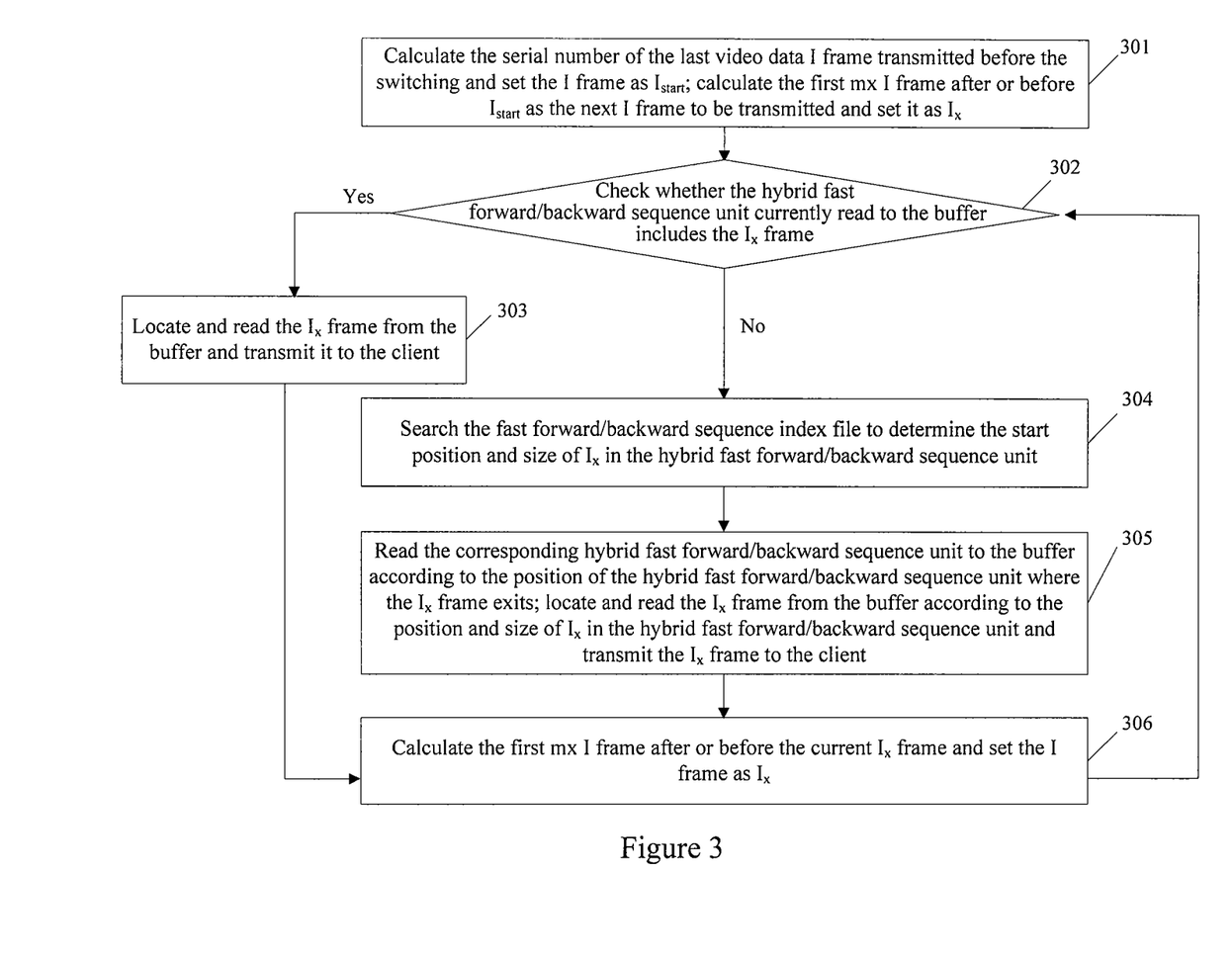
FIG. 3 is a flow chart for fast forward/backward play of video data according to another embodiment of the invention.

FIG. 3 is a flow chart for fast forward/backward play of video data according to another embodiment of the invention. The flow chart illustrates a procedure where a streaming server switches from scale n fast forward or fast backward play to scale m fast forward or fast backward play, where n and m are not equal. The procedure includes the following steps:

Step 301: Calculate the serial number of the last video data I frame transmitted before the switching and identify the I frame as $I_{start}$, and calculate the first I frame for scale m after or before $I_{start}$ as the next I frame to be transmitted, $I_x$.

Step 302: Check whether the hybrid fast forward/backward sequence unit currently read to the buffer includes the $I_x$ frame. If so, the procedure goes to step 303; otherwise, the procedure goes to step 304.

The specific implementation process of this step includes: if the m is a preset low scale, searching the standard scale fast forward/backward index file in the fast forward/backward sequence index file to locate the hybrid fast forward/backward sequence unit where the $I_x$ frame exists. The locating method is: locating the start position and size of the hybrid fast forward/backward sequence unit where the $I_x$ frame exists in the fast forward/backward sequence file and checking whether this unit is identical with a unit already read to the buffer.

If m is a preset high scale, search the high scale fast forward/backward index file in the fast forward/backward sequence index file, obtain all high scale I frames in the hybrid fast forward/backward sequence unit already read to the buffer and check whether $I_x$ is included.

Step 303: Locate and read video data corresponding to $I_x$ from the buffer and transmit the data to the client. Then the procedure goes to step 306.

Step 304: Search the fast forward/backward sequence index file to determine the start position and size of $I_x$ in the hybrid fast forward/backward sequence unit.

Step 305: Read the corresponding hybrid fast forward/backward sequence unit to the buffer according to the position of the hybrid fast forward/backward sequence unit where the $I_x$ frame exits; locate and read the $I_x$ frame from the buffer according to the start position and size of $I_x$ in the hybrid fast forward/backward sequence unit and transmit the $I_x$ frame to the client.

Step 306: Calculate the first I frame for scale m after or before the current $I_x$ frame and set the I frame as $I_x$ and the procedure goes back to step 302.

In the procedure shown in FIG. 3, when the streaming server receives a command to change the current play mode and the command is to play the media stream file normally, the method further includes the following step:

The streaming server calculates the start position of the media file for normal play according to the serial number of the last I frame currently transmitted, obtains the corresponding media stream data from the original media file according to the located start position, and sends the obtained media stream data to the client.

The following analyzes the reading efficiency of the method for fast forward/backward play of video data provided in embodiments shown in FIG. 2 and FIG. 3 and draws a comparison with the reading efficiency of the two technical solutions in the prior art.

The standard to measure the efficiency in reading video data in the time of fast forward/backward play at a specific scale is: reading an I frame sequence continuously and calculating the proportion of usable I frames in the entire sequence at the current scale. To ensure a high efficiency in reading video data for fast forward/backward play at all scales, the minimum value is taken as the fast forward/backward video data reading efficiency of the streaming server. The following analysis assumes that the system supports 2×, 4×, 8×, 16×, and 32× fast forward/backward play.

In the two solutions in the prior art, the fast forward/backward video data reading efficiency of all scales are respectively: 2× (all the obtained I frame sequence can be used for 2× fast forward/backward play and therefore the proportion is 100%), 4× (half the obtained I frame sequence can be used for 4× fast forward/backward play and therefore the proportion is 50%), 8× (¼ of the obtained I frame sequence can be used for 8× fast forward/backward play and therefore the proportion is 25%), 16× (⅛ of the obtained I frame sequence can be used for 16× fast forward/backward play and therefore the proportion is 12.5%), and 32× (1/16 of the obtained I frame sequence can be used for 32× fast forward/backward play and therefore the proportion is 6.25%).

The reading efficiency of 32× is the lowest and therefore the fast forward/backward reading efficiency of the streaming server is the 32× reading efficiency, 6.25%.

In the embodiments shown in FIG. 2 and FIG. 3, the standard fast forward/backward sequence is a 2× fast forward/ backward sequence, which occupies ½ space of a hybrid fast/forward/backward sequence unit; the high scale fast backward compensation sequence is a 16× fast backward compensation sequence, which occupies ¼ space of the hybrid fast forward/backward sequence unit; the high scale fast forward compensation sequence is a 16× fast forward compensation sequence, which occupies ¼ space of the hybrid fast forward/backward sequence unit. In this case, the fast forward/backward video data reading efficiency at each scale is:

2×: all the standard fast forward/backward sequence can be used for 2× fast forward/backward play and therefore the proportion is 50%;

4×: half the standard fast forward/backward sequence can be used for 4× fast forward/backward play and therefore the proportion is 25%;

8×: ¼ of the standard fast forward/backward sequence can be used for 8× fast forward/backward play and therefore the proportion is 12.5%;

16×: at least a high scale fast backward compensation sequence or high scale fast forward compensation sequence is usable and therefore the proportion is at least 25%;

32×: at least half of a high scale fast backward compensation sequence or high scale fast forward compensation sequence is usable and therefore the proportion is at least 12.5;

Among the values, the 8× or 32× reading efficiency is the lowest. Therefore, the fast forward/backward video data reading efficiency of the streaming server in the technical solution of the present invention is the 8× or 32× reading efficiency, 12.5%. Therefore, with the method provided in the embodiments shown in FIG. 2 and FIG. 3, the fast forward/backward reading efficiency of the streaming server is two times as high as that in the two solutions of the prior art.

In another embodiment of the invention, a second implementation scheme for generating a fast forward/backward sequence file and a fast forward/backward sequence index file using the obtained video data includes:

obtaining from the original media file video data respectively necessary for fast forward/backward play at each scale the system supports;

The step of generating a fast forward/backward sequence file and a fast forward/backward sequence index file using the obtained video data includes:

generating fast forward/backward sequence files of different scales respectively in turn using the obtained video data, all forward/backward sequence files of different scales forming the fast forward/backward sequence file;

meanwhile, generating fast forward/backward sequence index files of different scales, all forward/backward sequence index files of different scales forming the fast forward/backward sequence index file.

The step of obtaining fast forward/backward sequence index information that meets the play request from the fast forward/backward sequence index file includes: obtaining index information from the fast forward/backward sequence index file of the corresponding scale according to the scale specified by the received play request.

The step of obtaining video data that meets the play request from the fast forward/backward sequence file includes: obtaining video data that meets the received play request from the fast forward/backward sequence file of the corresponding scale according to the obtained index information.

Compared with the procedures shown in FIG. 2 and FIG. 3, the procedure according to the second implementation scheme for switching from normal play to fast forward/backward play of video data, or switching between different scales is different in the processing of locating the $I_x$ frame to be transmitted. In the second scheme, fast forward/backward sequence files and the corresponding index files are generated for each scale and therefore, after determining the $I_x$ frame to be transmitted, the streaming server will search the corresponding fast forward/backward sequence index file according to the target scale to locate the position information of the $I_x$ frame to be transmitted in the fast forward/backward sequence file of the corresponding scale. The position information may include the start position information of the $I_x$ frame to be transmitted in the fast forward/backward sequence file of the corresponding scale and the size of the $I_x$ frame.

Figure 4:
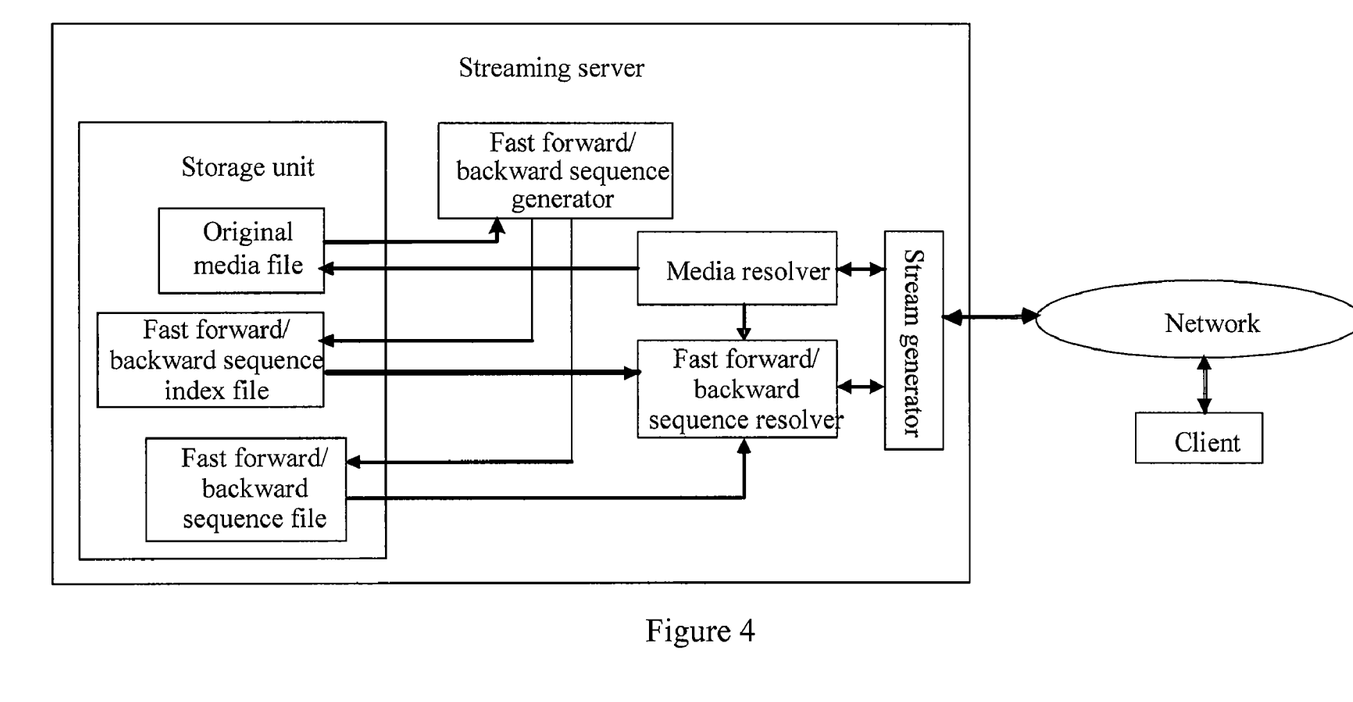
FIG. 4 shows the structure of a streaming server according to an embodiment of the invention.

An embodiment of the invention provides an apparatus for fast forward/backward play of video data, which is specifically a streaming server, as shown in FIG. 4. The streaming server includes: a stream generator, a storage unit, a fast forward/backward sequence resolver and a fast forward/backward sequence generator, in which, the storage unit is adapted to store the original media file, the fast forward/backward sequence file and the fast forward/backward sequence index file;

the fast forward/backward sequence generator is adapted to obtain video data necessary for fast forward/backward play at different scales from the original media file and generate the fast forward/backward sequence file and the fast forward/backward sequence index file;

the stream generator is adapted to receive a fast forward/backward play request from a client and transmit video data that meets the play request to the client via the network; and the fast forward/backward sequence resolver is adapted to obtain fast forward/backward sequence index information that meets the play request from the fast forward/backward sequence index file and obtain video data that meets the play request from the fast forward/backward sequence file according to the index information.

Here, the method to obtain video data that meets the play request may be: the fast forward/backward sequence resolver calls the play request in the stream generator and completes the above function according to the play request to obtain the video data that meets the play request; or the stream generator, after receiving the play request, sends a command that carries the play request to the fast forward/backward sequence resolver, instructing the fast forward/backward sequence resolver to complete the above function to obtain the video data that meets the play request.

The fast forward/backward sequence generator may include a first video data obtaining unit and a hybrid fast forward/backward sequence file generating unit.

The first video data obtaining unit is adapted to obtain video data respectively necessary for fast forward/backward play at the selected standard scale and high scale compensation scale from the original media file.

The hybrid fast forward/backward sequence file generating unit is adapted to generate multiple hybrid fast forward/backward sequence units of a set size by mixing the video data in turn according to selected proportions and generate a fast forward/backward sequence index file.

Or, the fast forward/backward sequence generator may include a second video data obtaining unit and a different scale fast forward/backward sequence file generating unit.

The second video data obtaining unit is adapted to obtain video data respectively necessary for fast forward/backward play at different scales that the current system supports from the original media file.

The different scale fast forward/backward sequence file generating unit is adapted to generate fast forward/backward sequence files that support fast forward/backward play at different scales in turn using the video data and generate the corresponding index files that support fast forward/backward play at different scales.

The stream generator in the streaming server includes: a fast forward/backward play request processing unit and a normal play request processing unit. The streaming server may further include a media resolver.

The fast forward/backward play request processing unit is adapted to receive a fast forward/backward play request from a client and transmit received video data to the client via the network.

The normal play request processing unit is adapted to receive a normal play request from a client and transmit received media stream data to the client via the network.

The media resolver is adapted to resolve media stream data from the original media file and transmit the obtained media stream data to the normal play request processing unit.

The media resolver in the streaming server includes: a play position determining unit and a media file resolving unit.

The play position determining unit is adapted to obtain attribute information of the last transmitted video data from the fast forward/backward sequence resolver and determine the start position of normal play according to the obtained attribute information.

The media file resolving unit is adapted to resolve media stream data from the original media file according to the normal play start position determined by the play position determining unit and transmit the obtained media stream data to the normal play request processing unit.

From the foregoing description, it is known that, with the method and streaming server for fast forward/backward play of video data provided by embodiments of the invention, the fast forward/backward video data reading efficiency of the streaming server is improved. The higher the fast forward/backward video data reading efficiency of the streaming server is, the more I frames read before switching can be used for the fast forward/backward video data play after the switching. Therefore, with the adoption of the technical solution provided by embodiments of the invention, when the play scale is switched, more data already read can be used for fast forward/backward play after the switching and data after the switching can be sent to the client more quickly. The mean response time for switching of scales is therefore shorter.

Reading of media files is a bottleneck of the streaming server. The throughput always decides the maximum concurrent users that the streaming server supports. When the maximum number of concurrent users that the streaming server supports is decided, resources a user needs to consume in the worst case must be considered. The number of concurrent users is true only when thus calculated. Otherwise, when the system is full loaded, once some users change their play modes so that more media file reading resources are required, the system is apt to being overloaded and therefore experience of all online users will be affected.

The maximum number of concurrent users that a steaming server supports is a key indicator to measure the performance of the streaming server. Embodiments of the invention reduce the media file reading resources required by high scale fast forward/backward play by balancing the media file reading efficiencies for fast forward/backward play at different scales and therefore increase the number of concurrent users that the streaming server supports. In addition, when hardware and software configurations are the same, the more concurrent users are supported, the lower the cost of streaming server apportioned to each user. This means the method and apparatus provided by embodiments of the invention can significantly reduce the streaming server cost per user.

Although the invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A method for fast forward/backward play of video data, comprising:
    selecting at least two different fast forward/backward play scales, one as a standard scale and the rest as high scale compensation scale;
    obtaining video data respectively necessary for fast forward/backward play at the at least two different fast forward/backward play scales from an original media file, wherein the video data obtained for the high scale compensation scale includes an amount of video data that is reduced from the amount of video data obtained for the standard scale;
    generating at least one fast forward/backward sequence file, wherein the process of generating the fast forward/backward sequence file using the obtained video data comprises:
    generating multiple hybrid fast forward/backward sequence units comprised in the fast forward/backward sequence file by mixing the video data necessary for fast forward/backward play at the at least two different fast forward/backward play scales in turn, wherein any one of the hybrid fast forward/backward sequence units comprises: a standard scale fast forward/backward sequence, at least one high scale fast backward compensation sequence, and at least one high scale fast forward compensation sequence; wherein the high scale fast backward compensation sequence in a hybrid fast forward/backward sequence unit is the high scale fast forward compensation sequence in a previous hybrid fast forward/backward sequence unit, and the high scale fast forward compensation sequence in the hybrid fast forward/backward sequence unit is the high scale fast backward compensation sequence in the next hybrid fast forward/backward sequence unit; generating at least one fast forward/backward sequence index file using the obtained video data;
    obtaining fast forward/backward index information that meets a fast forward/backward play request from the fast forward/backward sequence index file according to the fast forward/backward play request from a client; and
    obtaining video data that meets the fast forward/backward play request from the fast forward/backward sequence file according to the index information and transmitting the video data to the client via a network.

2. The method of claim 1, wherein the step of generating multiple hybrid fast forward/backward sequence units of a preset size comprises: generating hybrid fast forward/backward sequence units with a size equal to that of a buffer which reads video data.

3. The method of claim 1, wherein a start position of each of the at least one high scale fast forward compensation sequence is determined by an end position of the standard scale fast forward/backward sequence; and an end position of each of the at least one high scale fast backward compensation sequence is determined by a start position of the standard scale fast forward/backward sequence.

4. The method of claim 3, wherein the step of generating a fast forward/backward sequence index file comprises:
generating an index file for the hybrid fast forward/backward sequence units;
generating an index file for the standard scale fast forward/backward sequence; and
generating an index file for each high scale fast forward/backward sequence of each scale for each hybrid fast forward/backward sequence unit.

5. The method of claim 1, wherein the process of generating at least one fast forward/backward sequence index file comprises:
generating an index file for the hybrid fast forward/backward sequence units;
generating an index file for the standard scale fast forward/backward sequence; and
generating an index file for each high scale fast forward/backward sequence of each scale for each hybrid fast forward/backward sequence unit.

6. The method of claim 1, wherein, when the play request is switching from normal play to fast forward/backward play at a specific scale, the process of obtaining video data that meets the play request comprises:
determining a first I frame of the specific scale after or before a last I frame transmitted as an I frame to be transmitted;
searching the fast forward/backward sequence index file to obtain index information of the I frame to be transmitted if the last I frame transmitted is a normally played I frame, locating and reading the I frame to be transmitted from the fast forward/backward sequence file according to the obtained index information, and transmitting the I frame to the client; or
determining whether the I frame to be transmitted is already read to a buffer if the last I frame transmitted is played in fast forward/backward mode at the specific scale; if so, locating and reading the I frame to be transmitted from the buffer and transmitting to the client; otherwise, searching the fast forward/backward sequence index file to obtain and locate index information of the I frame to be transmitted, locating and reading the I frame to be transmitted from the fast forward/backward sequence file according to the obtained index information, and transmitting the I frame to the client.

7. The method of claim 1, wherein, when the streaming server receives a play request for switching from an initial scale to a target scale, further comprising:
determining a first I frame of the target scale after or before a last I frame transmitted as an I frame to be transmitted; and
checking whether current video data read to a buffer already includes the I frame to be transmitted; if so, locating and reading the I frame to be transmitted from the buffer and transmitting the I frame to the client; otherwise, searching the fast forward/backward sequence index file to obtain index information of the I frame to be transmitted, locating and reading the I frame to be transmitted from the fast forward/backward sequence file according to the obtained index information, and transmitting the I frame to the client.

8. The method of claim 7, wherein the process of searching the fast forward/backward sequence index file to obtain index information of the I frame to be transmitted comprises:
searching the fast forward/backward sequence index file to determine position information of one of the hybrid fast forward/backward sequence unit where the I frame to be transmitted exists and position information of the I frame to be transmitted in the hybrid fast forward/backward sequence unit;
the process of locating and reading the I frame to be transmitted comprises: reading the one of the hybrid fast forward/backward sequence units to the buffer according to the position information of the hybrid fast forward/backward sequence unit where the I frame to be transmitted exists, locating and reading the I frame to be transmitted from the buffer according to the position information of the I frame to be transmitted in the hybrid fast forward/backward sequence unit; and
the process of determining whether the I frame to be transmitted is already read to the buffer comprises: determining whether the hybrid fast forward/backward sequence unit where the I frame to be transmitted exists is already read to the buffer.

9. The method of claim 8, wherein, upon switching to fast forward or fast backward play at a set low scale, the process of determining whether the hybrid fast forward/backward sequence unit where the I frame to be transmitted exists is already read to the buffer comprises: searching the standard scale fast forward/backward sequence index file in the fast forward/backward sequence index file to determine whether the hybrid fast forward/backward sequence unit where the I frame to be transmitted exists is already read to the buffer;
upon switching to fast forward or fast backward play at a set high scale, the process of determining whether the hybrid fast forward/backward sequence unit where the I frame to be transmitted exists is already read to the buffer comprises: searching the high scale fast forward/backward sequence index file in the fast forward/backward sequence index file to determine whether the hybrid fast forward/backward sequence unit where the I frame to be transmitted exists is already read to the buffer.

10. The method of claim 1, wherein the video data obtained for the high scale compensation scale includes an amount of video data that is proportionally reduced from the amount of video data obtained for the standard scale based on the ratio of the high scale to the standard scale.

11. The method of claim 1, wherein within the hybrid fast forward/backward sequence unit the standard scale fast forward/backward sequence occupies half the space, the high scale fast backward compensation sequence occupies one quarter of the space, and the high scale fast forward compensation sequence occupies one quarter of the space.

12. A streaming server, comprising: a stream generator, a storage unit, a fast forward/backward sequence resolver, and a fast forward/backward sequence generator, wherein:
the storage unit is adapted to store an original media file, a fast forward/backward sequence file, and a fast forward/backward sequence index file;
the fast forward/backward sequence generator comprises: a first video data obtaining unit and a fast forward/backward sequence file generating unit;
the first video data obtaining unit is adapted to obtain video data respectively necessary for fast forward/backward play at selected standard scale and high scale compensation scales from the original media file wherein the video data obtained for the high scale compensation scale includes an amount of video data that is reduced from the amount of video data obtained for the standard scale;

the fast forward/backward sequence file generating unit is adapted to generate a fast forward/backward sequence file of a set size, wherein the process of generating the fast forward/backward sequence file using the obtained video data comprises:

generating multiple hybrid fast forward/backward sequence units comprised in the fast forward/backward sequence file by mixing the video data in turn and generating a fast forward/backward sequence index file;

the hybrid fast forward/backward sequence units comprises: a standard scale fast forward/backward sequence, at least one high scale fast backward compensation sequence, and at least one high scale fast forward compensation sequence, wherein the high scale fast backward compensation sequence in a hybrid fast forward/backward sequence unit is the high scale fast forward compensation sequence in a previous hybrid fast forward/backward sequence unit, and the high scale fast forward compensation sequence in the hybrid fast forward/backward sequence unit is the high scale fast backward compensation sequence in the next hybrid fast forward/backward sequence unit;

the stream generator is adapted to receive a fast forward/backward play request from a client and transmit video data that meets the play request to the client via a network; and the fast forward/backward sequence resolver is adapted to obtain fast forward/backward sequence index information that meets the play request from the fast forward/backward sequence index file and obtain video data that meets the play request from the fast forward/backward sequence file according to the index information.

13. The streaming server of claim 12, wherein the fast forward/backward sequence generator comprises: a second video data obtaining unit and a different scale fast forward/backward sequence file generating unit;

the second video data obtaining unit is adapted to obtain video data respectively necessary for fast forward/backward play at different scales that the current system supports from the original media file; and the different scale fast forward/backward sequence file generating unit is adapted to generate fast forward/backward sequence files that support fast forward/backward play at different scales in turn using the video data and generate corresponding index files that support fast forward/backward play at different scales.

14. The streaming server of claim 12, wherein the stream generator comprises a fast forward/backward play request processing unit and a normal play request processing unit and the streaming server further comprises a media resolver;

the fast forward/backward play request processing unit is adapted to receive a fast forward/backward play request from a client and transmit received video data to the client via a network;

the normal play request processing unit is adapted to receive a normal play request from a client and transmit received media stream data to the client via the network; and the media resolver is adapted to resolve media stream data from the original media file according to the normal play request and transmit the obtained media stream data to the normal play request processing unit.

15. The streaming server of claim 14, wherein the media resolver comprises a media file resolving unit and a play position determining unit;

the play position determining unit is adapted to obtain attribute information of last transmitted video data from the fast forward/backward sequence resolver according to the normal play request and determine a start position of normal play according to the obtained attribute information; and the media file resolving unit is adapted to resolve media stream data from the original media file according to the start position of normal play and transmit the obtained media stream data to the normal play request processing unit.

16. The streaming server of claim 12, wherein the video data obtained for the high scale compensation scale includes an amount of video data that is proportionally reduced from the amount of video data obtained for the standard scale based on the ratio of the high scale to the standard scale.

17. The method of claim 12, wherein within the hybrid fast forward/backward sequence unit the standard scale fast forward/backward sequence occupies half the space, the high scale fast backward compensation sequence occupies one quarter of the space, and the high scale fast forward compensation sequence occupies one quarter of the space.

* * * * *